United States Patent
Thornton et al.

(10) Patent No.: US 12,330,789 B2
(45) Date of Patent: Jun. 17, 2025

(54) PARTITION

(71) Applicant: Gulfstream Aerospace Corporation, Savannah, GA (US)

(72) Inventors: Sean Thornton, Savannah, GA (US); Brian Toler, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 348 days.

(21) Appl. No.: 18/049,163

(22) Filed: Oct. 24, 2022

(65) Prior Publication Data
US 2024/0132216 A1 Apr. 25, 2024
US 2024/0228042 A9 Jul. 11, 2024

(51) Int. Cl.
*B64D 11/00* (2006.01)
*E04B 2/74* (2006.01)

(52) U.S. Cl.
CPC ........ *B64D 11/0023* (2013.01); *E04B 2/7401* (2013.01)

(58) Field of Classification Search
CPC ............... B64D 11/0023; E04B 2/7401; E06B 2009/002; E06B 9/02; E06B 9/06; E06B 9/0607; E06B 9/0615; E06B 9/0623; E06B 9/063; E06B 9/0646; E06B 9/0653; E06B 9/0661; E06B 9/0676; E06B 9/0805; E06B 3/94
See application file for complete search history.

(56) References Cited

U.S. PATENT DOCUMENTS

| | | | | |
|---|---|---|---|---|
| 2,132,272 A * | 10/1938 | Reid | ........................ | B60J 10/15 49/500.1 |
| 3,095,032 A * | 6/1963 | Sinnock | .................... | E06B 3/94 160/84.11 |
| 3,133,589 A * | 5/1964 | Harris | ........................ | E06B 9/92 160/84.11 |
| 3,135,174 A | 6/1964 | Lucien | | |
| 4,095,639 A * | 6/1978 | Ryan | ....................... | A01G 9/225 160/84.02 |
| 4,597,549 A * | 7/1986 | Ryan | ........................ | B64C 1/10 244/129.5 |

(Continued)

FOREIGN PATENT DOCUMENTS

WO 2022076679 A1 4/2022

*Primary Examiner* — Johnnie A. Shablack
(74) *Attorney, Agent, or Firm* — Lorenz & Kopf, LLP

(57) ABSTRACT

A partition including, but not limited to, a first body comprising a planar, foldable material. The partition further comprises a plurality of flat substrates resistant to folding. The partition further comprising an adhesive. The substrates are adhered to the first body by the adhesive and arranged in a repeating pattern that defines a plurality of columns and rows. Each column and each row is spaced apart from its neighbor, thus defining longitudinal gaps between the columns and lateral gaps between the rows. The first body folds laterally along the longitudinal gaps in an accordion-like manner and contemporaneously folds longitudinally along the lateral gaps in an accordion-like manner. The partition contracts both laterally and longitudinally when first body contemporaneously folds laterally and longitudinally. The partition extends both laterally and longitudinally when the first body contemporaneously unfolds laterally and longitudinally.

18 Claims, 10 Drawing Sheets

(56) References Cited

U.S. PATENT DOCUMENTS

| | | | | |
|---|---|---|---|---|
| 4,862,941 A * | 9/1989 | Colson | ............... | E06B 9/262 160/279 |
| 4,915,153 A * | 4/1990 | Toti | ............... | A47H 15/02 160/345 |
| 4,928,369 A * | 5/1990 | Schnebly | ............... | E06B 9/262 29/24.5 |
| 5,301,733 A * | 4/1994 | Toti | ............... | E06B 9/367 160/84.01 |
| 5,339,883 A * | 8/1994 | Colson | ............... | E06B 9/262 160/84.05 |
| 5,392,832 A * | 2/1995 | Colson | ............... | E06B 9/262 160/176.1 V |
| 5,832,979 A * | 11/1998 | Marusak | ............... | E06B 9/36 160/173 V |
| 6,152,205 A * | 11/2000 | Toti | ............... | E06B 9/362 160/84.04 |
| 7,513,291 B2 * | 4/2009 | Colson | ............... | E06B 9/262 160/168.1 V |
| 8,256,488 B2 * | 9/2012 | Ruggles | ............... | E06B 9/262 160/84.01 |
| 8,561,666 B2 * | 10/2013 | MacAllen | ............... | E04B 2/7401 160/84.05 |
| 8,869,865 B2 * | 10/2014 | Roach | ............... | B64D 11/0023 160/84.04 |
| 9,540,874 B2 * | 1/2017 | Colson | ............... | A47H 23/04 |
| 9,856,695 B2 * | 1/2018 | Leadens, II | ............... | B64D 11/0023 |
| 11,433,986 B2 * | 9/2022 | Breigenzer | ............... | B64C 1/1469 |
| 2011/0008598 A1 | 1/2011 | Agneloni | | |
| 2013/0327465 A1 | 12/2013 | Borusheski | | |
| 2016/0297525 A1 | 10/2016 | Walton et al. | | |
| 2016/0349014 A1 | 12/2016 | Contri | | |
| 2017/0283065 A1 | 10/2017 | Papke et al. | | |
| 2021/0002952 A1 * | 1/2021 | Torres | ............... | E06B 9/262 |
| 2021/0291955 A1 | 9/2021 | Breigenzer et al. | | |
| 2022/0118733 A1 | 4/2022 | Yoneshima | | |
| 2022/0242571 A1 | 8/2022 | Dowty | | |
| 2023/0077585 A1 | 3/2023 | Wen et al. | | |
| 2024/0158081 A1 * | 5/2024 | Changizi | ............... | B64D 11/0023 |

\* cited by examiner

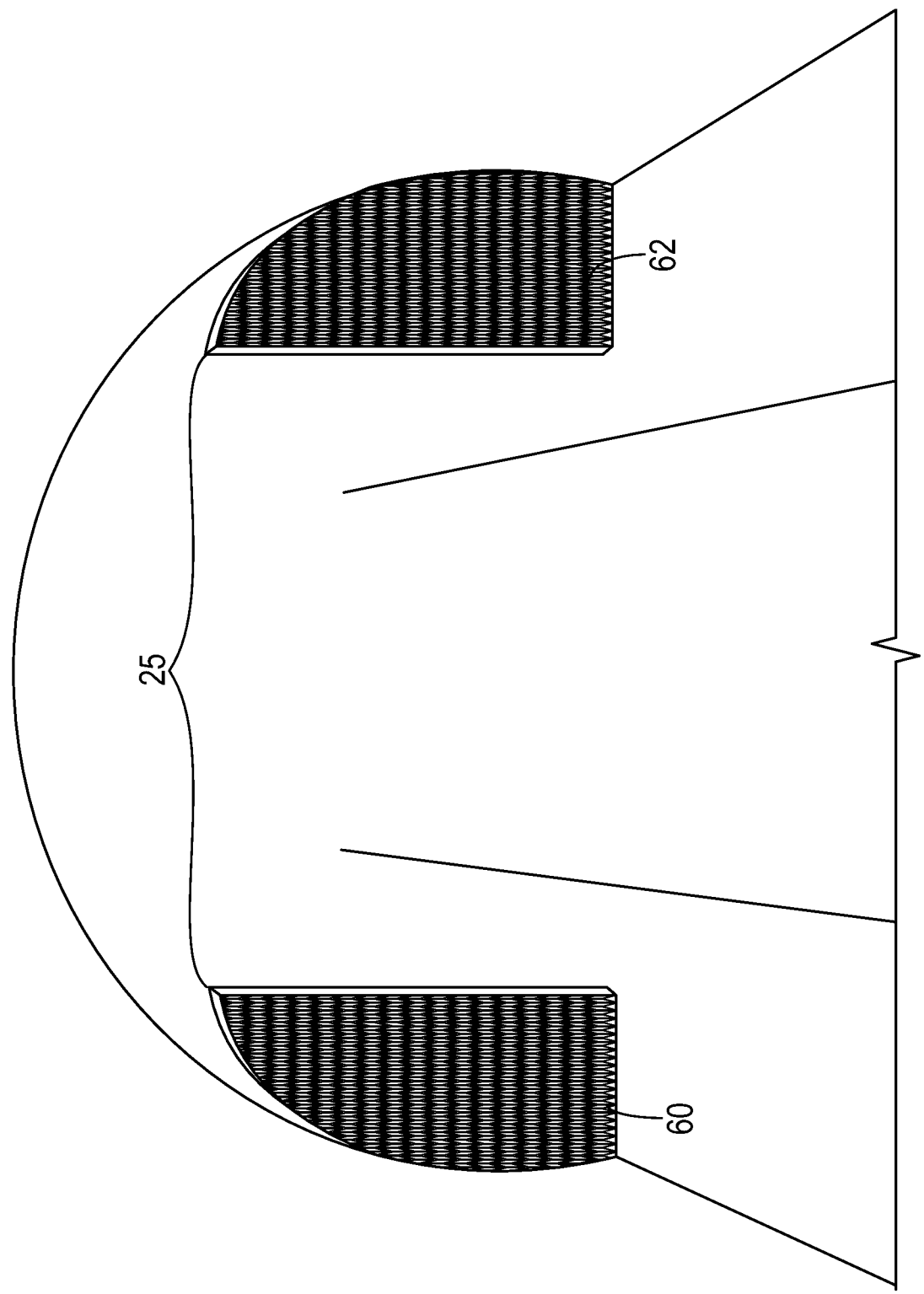

PARTITION

TECHNICAL FIELD

The present invention relates generally to partitions and more particularly to partitions used to divide space occupied by people.

BACKGROUND

Conventional partitions, such as those used to separate one room or chamber from another, or such as those used to divide an undivided space into divided space take a wide variety of forms. For example, conventional partitions include pivoting doors, pocket doors, swinging doors, metal bulkheads, retractable walls, curtains, hide-a-walls, and the like.

In a conventional aircraft interior, metal bulkheads affixed to opposite walls of a tubular aircraft cabin are commonly used in combination with curtains to separate one portion of an aircraft cabin from an adjacent portion to form separate compartments. Metal bulkheads consume floorspace and add weight to the aircraft. They are immovable and must be accounted for when formulating a floorplan for the aircraft's furniture and other accoutrements. Fabric curtains hanging between the bulkheads are heavy and lack an aesthetically pleasing appearance.

Accordingly, it is desirable to provide a partition that addresses the concerns expressed above. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments of a partition are disclosed herein.

In a first non-limiting embodiment, the partition includes, but is not limited to, a first body that comprises a foldable material. The first body has a first side and a second side. The first body has a planar configuration when unfolded. The partition further includes, but is not limited to, a plurality of substrates. Each substrate of the plurality of substrates has a flat geometric shape and is resistant to folding. The partition further includes, but is not limited to, an adhesive. Each substrate of the plurality of substrates is adhered to the second side of the first body by the adhesive and is arranged in a repeating pattern that defines a plurality of columns and a plurality of rows. Each column of the plurality of columns is spaced apart from each neighboring column to define a plurality of longitudinally extending gaps between columns. Each row of the plurality of rows is spaced apart from each neighboring row to define a plurality of laterally extending gaps between rows. The first body is configured to fold in a lateral direction along the plurality of longitudinally extending gaps in an accordion-like manner and to contemporaneously fold in a longitudinal direction along the plurality of laterally extending gaps between rows in the accordion-like manner. The partition contracts both laterally and longitudinally when the first body contemporaneously folds in both the lateral direction and the longitudinal direction. The partition extends both laterally and longitudinally when the first body contemporaneously unfolds in both the lateral direction and the longitudinal direction.

In another non-limiting embodiment, the partition includes, but is not limited to, a first body that comprises a foldable material. The first body has a first side and a second side. The first body has a planar configuration when unfolded. The partition further includes, but is not limited to a plurality of substrates. Each substrate of the plurality of substrates has a flat geometric shape and is resistant to folding. The partition further includes, but is not limited to a second body that comprises a decorative, foldable material. The second body has the planar configuration when unfolded. The partition further includes, but is not limited to a third body that comprises the decorative, foldable material. The third body has the planar configuration when unfolded. The partition still further includes, but is not limited to an adhesive. Each substrate of the plurality of substrates is adhered to the second side of the first body by the adhesive and arranged in a repeating pattern defining a plurality of columns and a plurality of rows. Each column of the plurality of columns is spaced apart from each neighboring column to define a plurality of longitudinally extending gaps between columns. Each row of the plurality of rows is spaced apart from each neighboring row to define a plurality of laterally extending gaps between rows. The second body is adhered to the first side of the first body by the adhesive. The third body is adhered to the second side of the first body and to a back side of the plurality of substrates by the adhesive. The first body and the second body and the third body are configured to fold in a lateral direction along the plurality of longitudinally extending gaps in an accordion-like manner and to contemporaneously fold in a longitudinal direction along the plurality of laterally extending gaps between rows in the accordion-like manner. The partition contracts both laterally and longitudinally when first body, the second body, and the third body contemporaneously fold in both the lateral direction and the longitudinal direction. The partition extends both laterally and longitudinally when the first body, the second body, and the third body contemporaneously unfold in both the lateral direction and the longitudinal direction.

BRIEF DESCRIPTION OF THE DRAWINGS

The present invention will hereinafter be described in conjunction with the following drawing figures, wherein like numerals denote like elements.

FIG. 10 is a perspective view similar to FIG. 9 with the partition disposed in a fully open configuration.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved partition is disclosed herein. The partition of the present disclosure is configured to fold and unfold between an open and a closed position. Whereas a conventional curtain or foldable partition is configured to fold in an accordion-like fashion in only a single direction (e.g., laterally), the partition of the present disclosure is configured to fold in two directions, both laterally and longitudinally. Furthermore, the partition of the present disclosure is configured to do so contemporaneously. This is accomplished through the use of multiple layers, at least one layer of which comprises a plurality of substrates that are constructed from a material that is resistant to folding and a second layer which is suitable for folding. Each substrate of the plurality of substrates has the same size and shape and each is affixed to the second layer via an adhesive. The plurality of substrates are arranged in a spaced-apart pattern that creates both rows and columns. In a non-limiting example, the pattern is a herringbone pattern. The second layer is configured to fold in an accordion-like manner contemporaneously along both the rows and the columns. Accordingly, when folded contemporaneously along the rows and columns, the partition contracts both laterally and longitudinally. Conversely, when unfolded along the rows and columns, the partition extends both laterally and longitudinally.

A greater understanding of the partition discussed above may be obtained through a review of the illustrations accompanying this application together with a review of the detailed description that follows.

Figure 1:
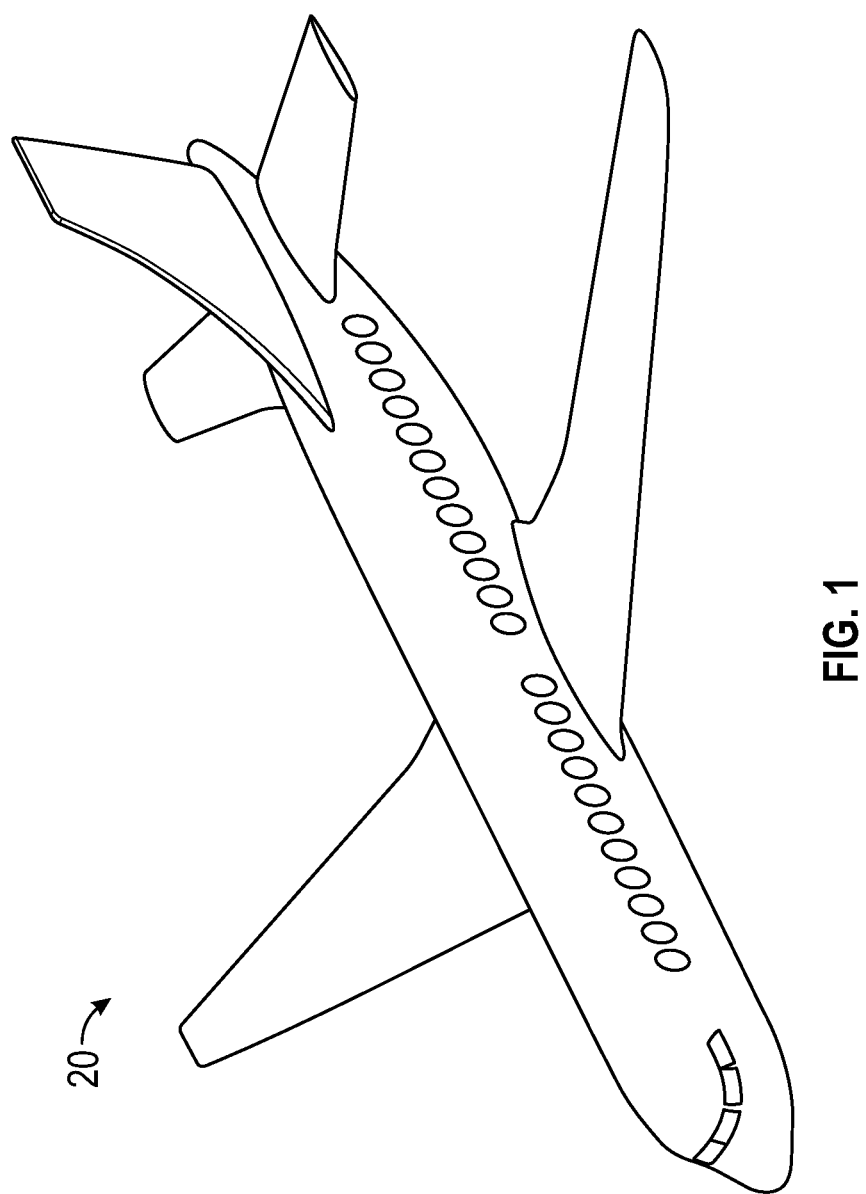
FIG. 1 is a perspective view illustrating a non-limiting example of a vehicle suitable for use with non-limiting embodiments of a partition made in accordance with the teachings disclosed herein.

FIG. 1 is a perspective view of a non-limiting example of a vehicle 20 suitable for use with the partition disclosed herein. In the illustrated embodiment, vehicle 20 is depicted as aircraft. While the partition disclosed herein is compatible for use onboard an aircraft, it should be understood that the partition disclosed here is not limited to such use. Rather, the partition disclosed herein is compatible with all types of vehicles. Further, the partition disclosed herein is not limited to with vehicles. Rather, the partition disclosed herein may be used in any conceivable application that calls for the use of partitions to divide or close off spaces. For instance, and without limitation, the partition disclosed herein may be employed in domestic applications as an alternative to a swinging or pocket door. Further, the partition disclosed herein may be employed in office applications to serve as a means for dividing workstations into cubicles. In other embodiments, the partition of the present invention may be employed in any other application which calls for the use of a conventional partition.

Figure 2:
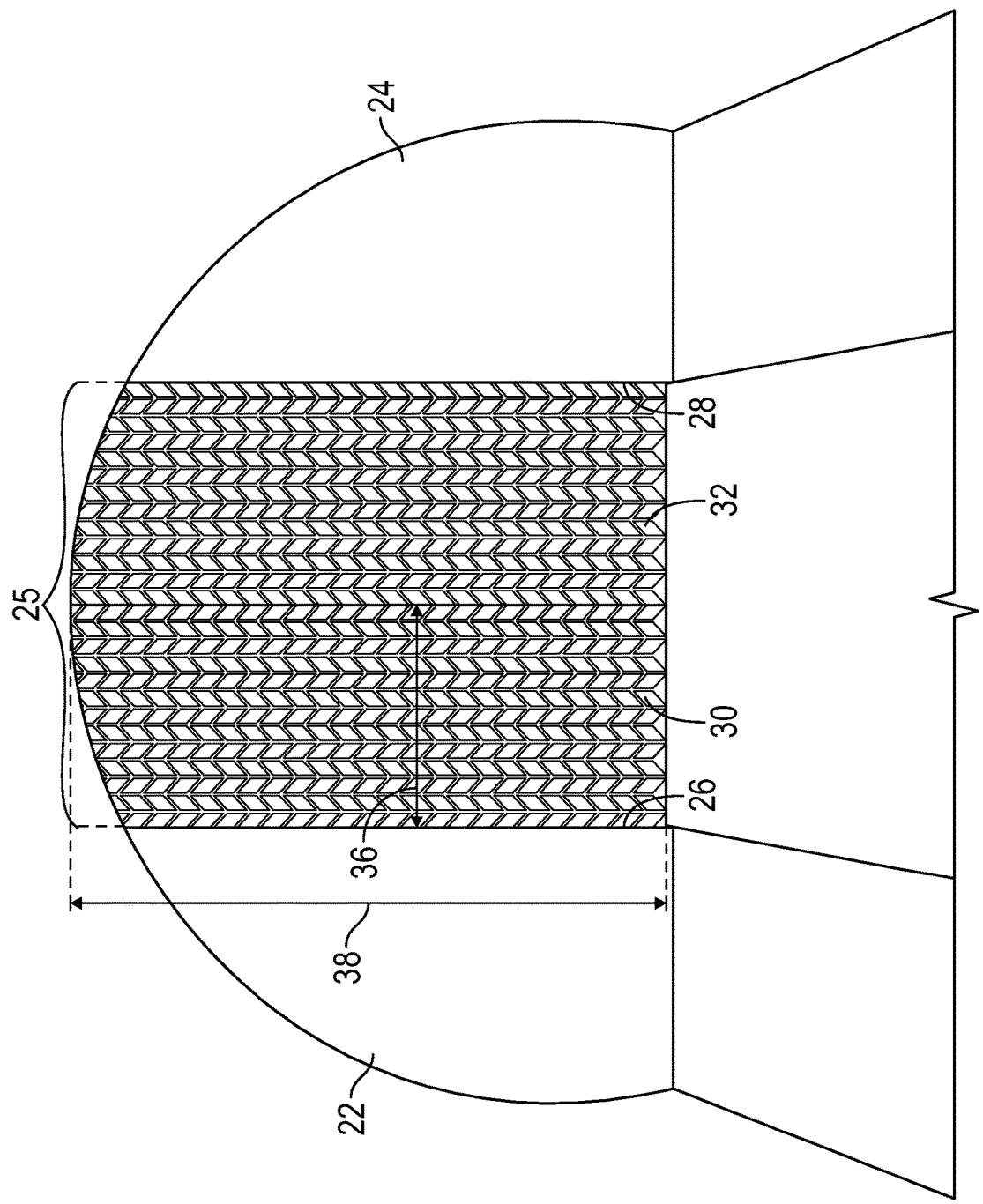
FIG. 2 is a perspective view illustrating an interior of the vehicle of FIG. 1 equipped with a non-limiting example of the partition made in accordance with the teachings disclosed herein, the partition being disposed in a closed configuration.

With continuing reference to FIG. 1, FIG. 2 is a perspective view illustrating an upstream or forward-looking longitudinal view of an interior of vehicle 20. Bulkhead 22 and bulkhead 24 extend from opposite interior walls of a cabin of vehicle 20. Bulkheads 22 and 24 extend laterally into a center portion of the cabin. A gap 25 is formed between an inboard edge 26 of bulkhead 22 and an inboard edge 28 of bulkhead 24. Closing off gap 25 is a partition 30 and a partition 32, each of which have been made in accordance with the teachings of the present disclosure. In another non-limiting embodiment, a single partition may be employed to span gap 25.

In the illustrated embodiment, partition 30 extends in an inboard direction from inboard edge 26 and partition 32 extends in an inboard direction from inboard edge 28. In FIG. 2, partition 30 and partition 32 are fully extended and meet in the middle to close off gap 25. In an example, the two partitions are held together in the middle of the cabin by any suitable coupling mechanism, including, but without limitation, by hook and loop connectors or by magnets. This configuration will be referred to herein alternately as the closed position or the extended position. When in the closed position, the upper peripheral contour of partition 30 and partition 32 are configured to have an arc that conforms to the circular interior contour of the ceiling of the cabin of vehicle 20. In other embodiments, any portion of the periphery of partition 30 and any portion of partition 32 may be contoured to conform to the curvature of the internal surface of any opening that partition 30 and partition are coupled with.

As illustrated in FIG. 2, partition 30 and partition 32 each have a decorative appearance that is aesthetically pleasing. In the illustrated embodiment, the decorative appearance comprises a herringbone pattern. As discussed in detail below, the herringbone pattern is not superficial or merely surface level, but rather, it runs throughout the entire structure of partitions 30 and 32. Partition 30 and partition 32 are each configured and trained to fold in an accordion-like fashion along the folds in the herringbone pattern. Specifically, each partition is configured to contemporaneously fold horizontally or laterally along a lateral axis 36, and to also fold vertically or longitudinally along a longitudinal axis 38. Being able to fold both horizontally and vertically in an accordion-like fashion has the effect of causing each partition to contract along both its length and height dimensions which, in turn, causes an increase in the width or thickness of each partition when folded or contracted. Although a herringbone pattern has been illustrated in FIG. 2 and throughout this disclosure, it should be understood that any other suitable repeating pattern that is effective to permit the contemporaneous folding of the partition in both a horizontal and vertical direction may also be employed without departing from the teachings of the present disclosure.

Figure 3:
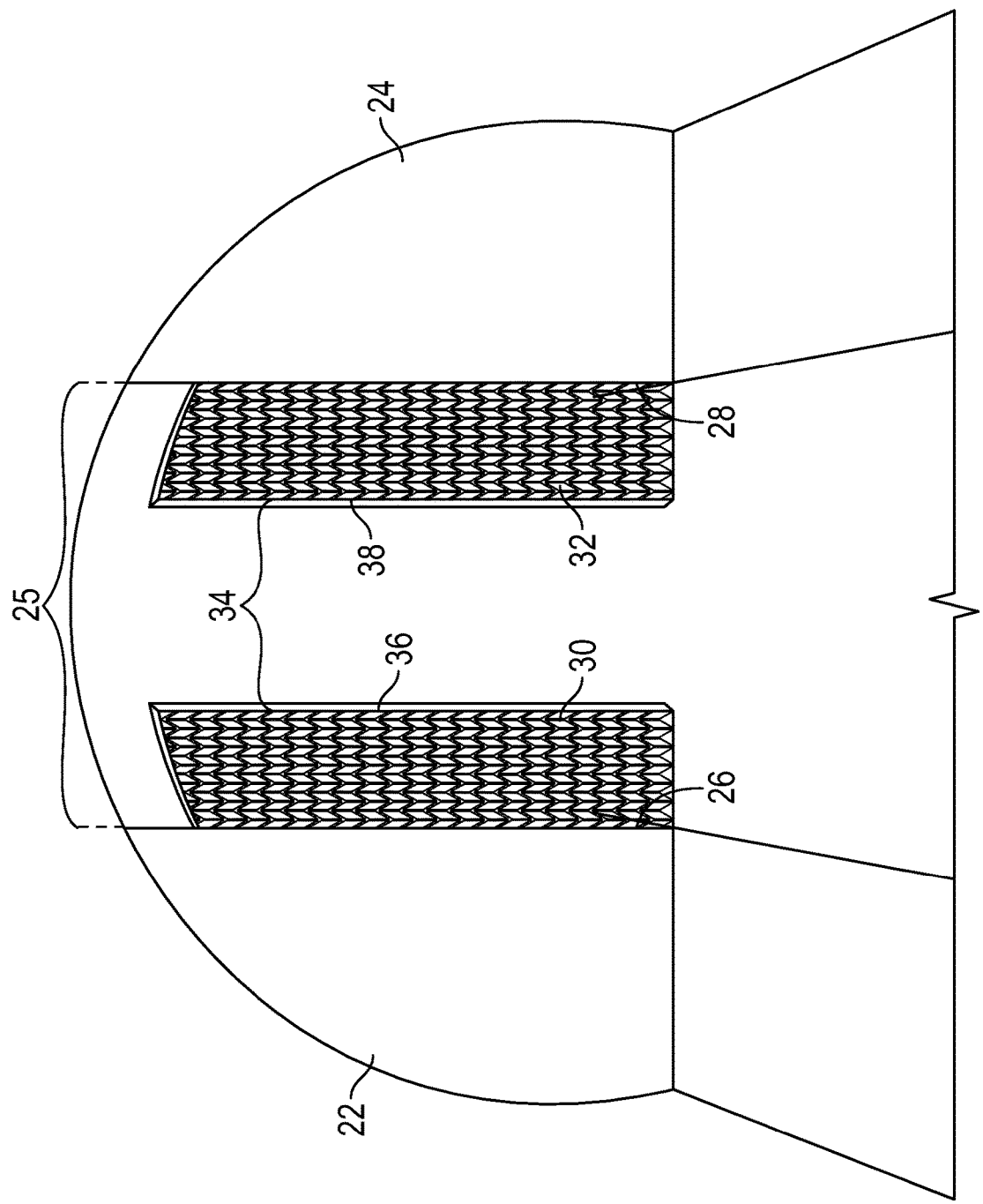
FIG. 3 is a perspective view similar to FIG. 2 with the partition disposed in a partially open configuration.

With continuing reference to FIGS. 1-2, FIG. 3 is a perspective view illustrating the upstream or forward-looking longitudinal view of the interior of vehicle 20 shown in FIG. 2 with partition 30 and partition 32 in a partially folded or contracted state. In the illustrated embodiment, partition 30 and partition 32 are mounted to inboard edge 26 and inboard edge 28, respectively, at a longitudinally central location along each partition. Consequently, in the illustrated embodiment, when partition 30 contracts, an upper end of partition 30 contracts vertically downwards from a ceiling of the cabin and a lower end of partition 30 contracts vertically upwards from a floor of the cabin. The same applies to partition 32.

In an alternate embodiment, partition 30 and partition 32 may be mounted to inboard edge 26 and inboard edge 28 at a vertically lower location along partition 30 and partition 32, respectively. In such an embodiment, partition 30 would contract longitudinally downward from a ceiling of the cabin while a lower portion of partition 30 would remain adjacent a floor surface of the cabin. Conversely, in yet another embodiment, partition 30 and partition 32 may be mounted to inboard edge 26 and inboard edge 28 at a vertically upper location along partition 30 and partition 32, respectively. In such an embodiment, partition 30 would contract longitudinally upward from a floor of the cabin.

As illustrated in FIG. 3, with partition 30 and partition 32 in a partially contracted state, a gap 34 has formed present between an inboard edge 36 of partition 30 and an inboard edge of partition 32. The magnitude of gap 34 can be controlled by a user by simply contracting partition 30 and partition 32 to a desired state of contraction. Gap 34 permits movement between two compartments of the cabin divided by partitions 30 and 32 while still providing some degree of separation between the two compartments. In an embodiment, partition 30 and partition 32 may comprise a magnet or a plurality of magnets that facilitate retaining partition 30 and partition 32 in their partially contracted states.

Figure 4:
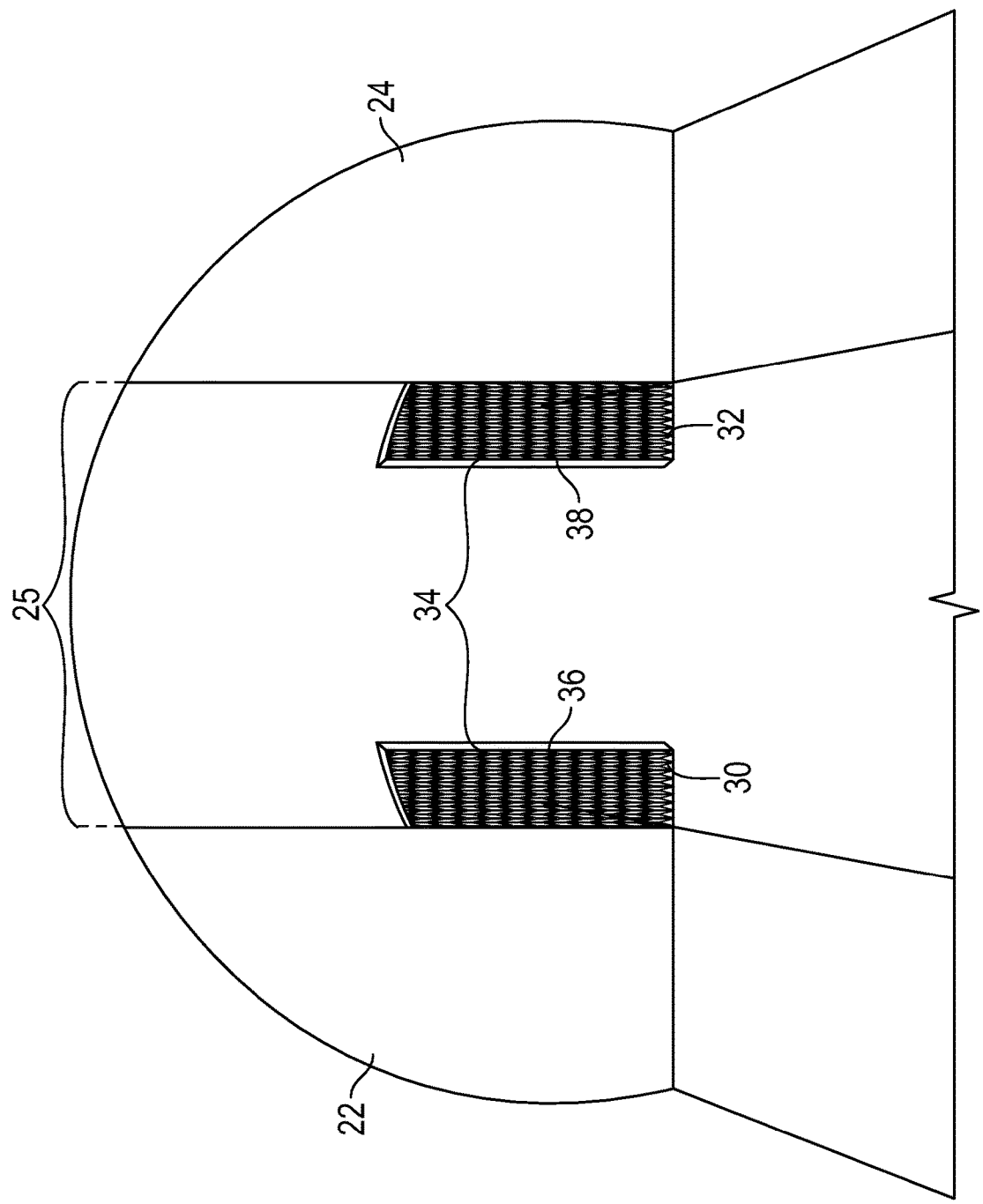
FIG. 4 is a perspective view similar to FIG. 3 with the partition disposed in a fully open configuration.

With continuing reference to FIGS. 1-3, FIG. 4 is a perspective view illustrating the upstream or forward-looking longitudinal view of the interior of vehicle 20 shown in FIGS. 2 and 3 with partition 30 and partition 32 in a fully folded or contracted state. As illustrated in FIG. 4, with partition 30 and partition 32 in a fully contracted state, gap 34 has widened as compared with FIG. 3. In this fully folded or contracted state, partitions 30 and 32 have contracted both laterally and longitudinally as compared with their respective states as illustrated in FIG. 3. Also, when fully folded or contracted, gap 34 permits the greatest degree of access and movement between the two compartments of the cabin that are divided by partitions 30 and 32. This configuration will be referred to herein alternately as the open position or the retracted position. As discussed above, in an embodiment, partition 30 and partition 32 may comprise a magnet or a plurality of magnets that facilitate retaining partition 30 and partition 32 in their fully contracted states.

With continuing reference to FIGS. 1-4, FIG. 5 is an exploded view of partition 30. In the illustrated embodiment, partition 30 and partition 32 are substantially identical. Consequently, the description provided below of the exploded view of partition 30 applies equally to partition 32.

Figure 5:
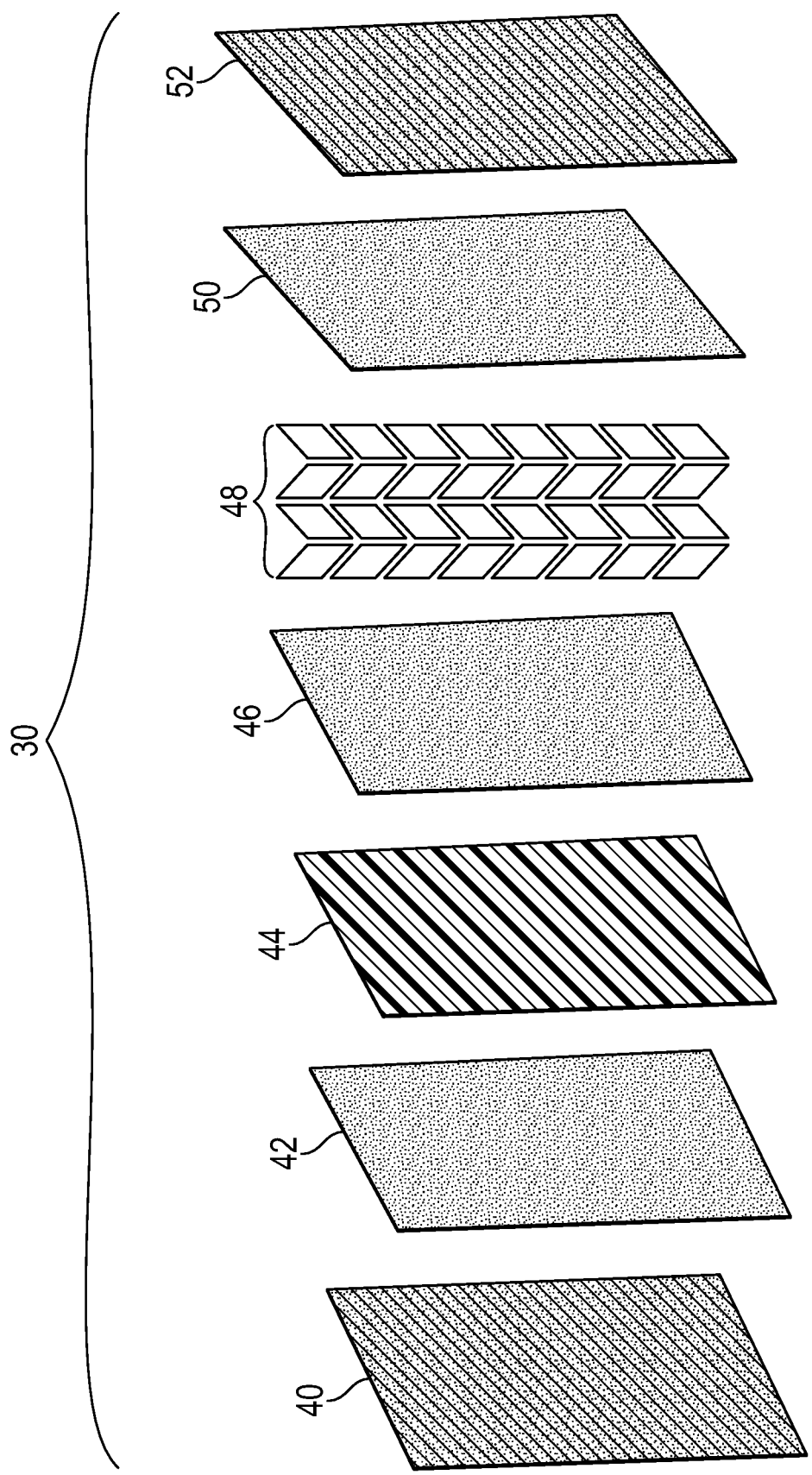
FIG. 5 is an exploded view of the partition of FIGS. 2-4.
Figure 6:
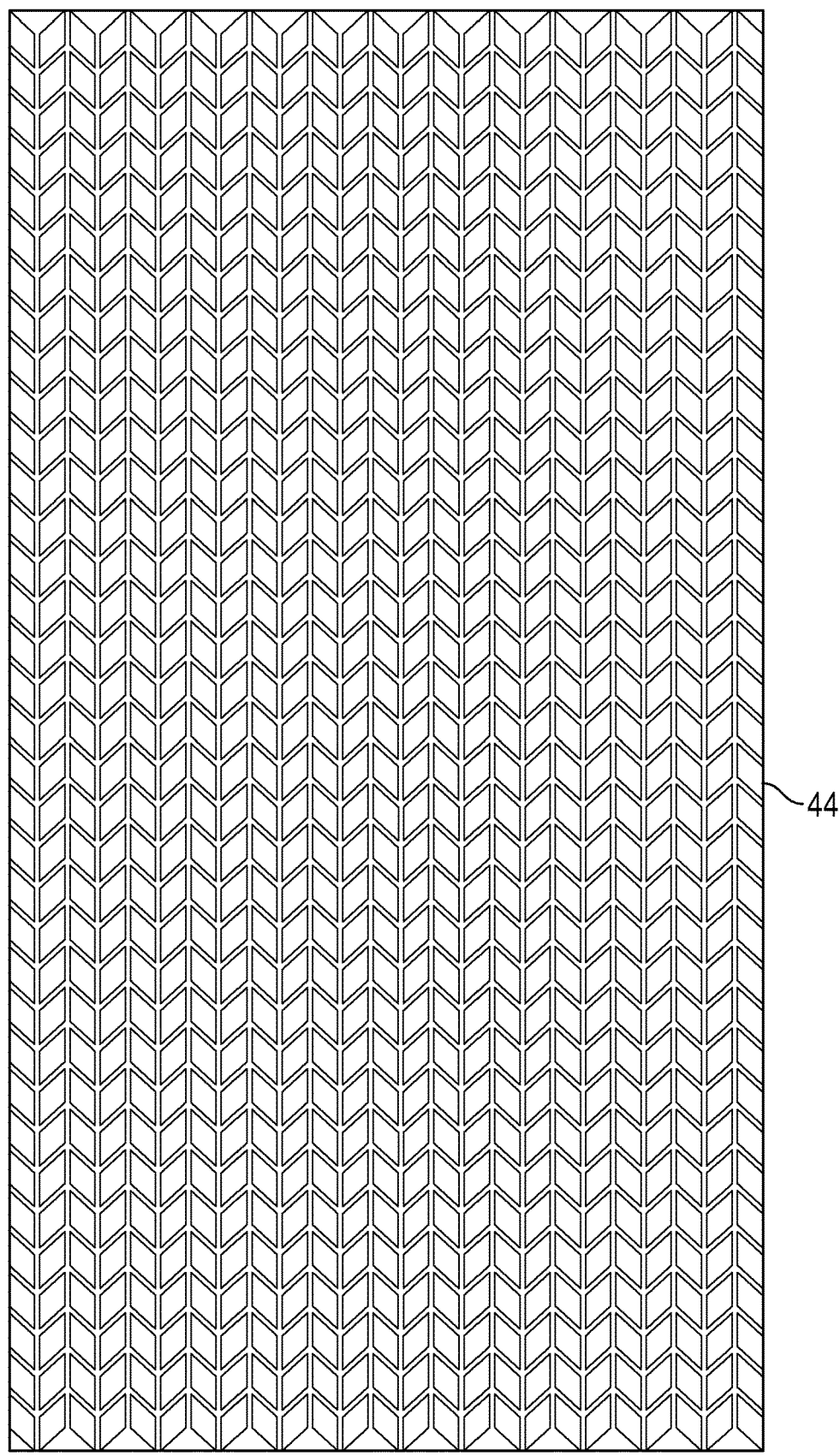
FIG. 6 is a perspective view illustrating a non-limiting example of a support layer of the partition of FIGS. 2-4.
Figure 7:
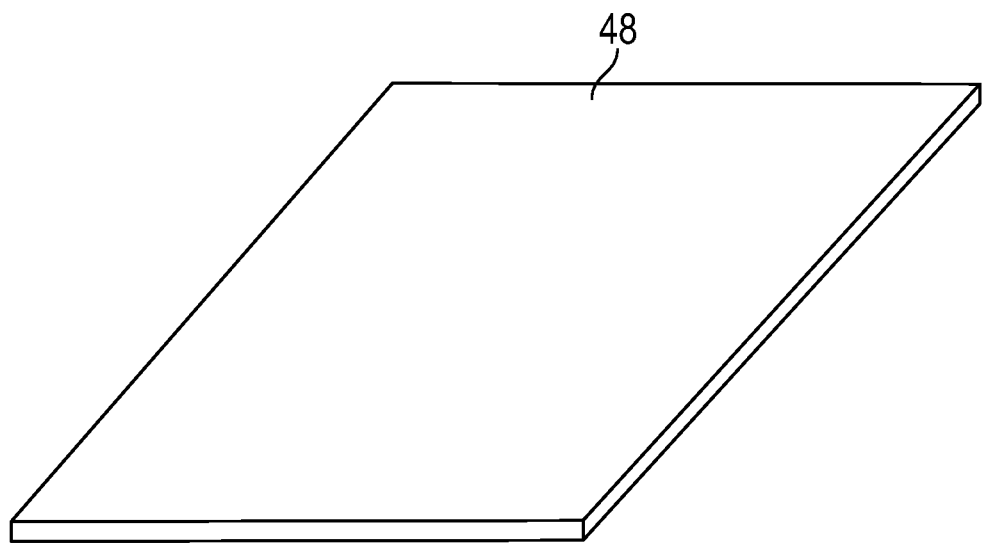
FIG. 7 is a perspective view of a non-limiting example of a substrate of the partition of FIGS. 2-4.
Figure 8:
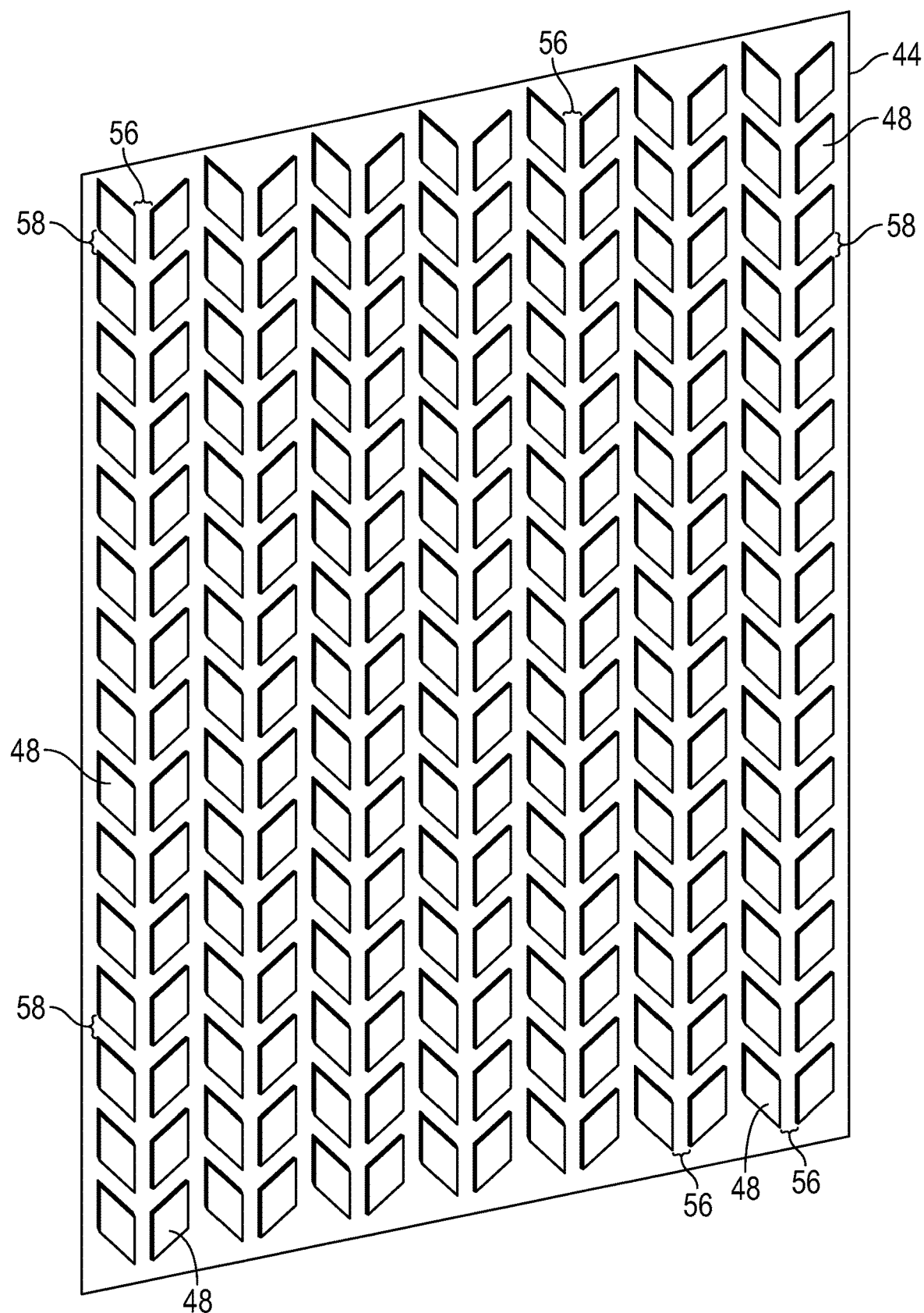
FIG. 8 is a perspective view illustrating the multiple substrates of FIG. 7 coupled with the support layer of FIG. 6.

The embodiment of partition 30 illustrated in FIG. 5 includes a decorative layer 40, an adhesive layer 42, a support layer 44, an adhesive layer 46, a plurality of substrates 48, an adhesive layer 50, and a decorative layer 52. In other embodiments, a greater or lesser number of layers may be employed without departing from the teachings of the present disclosure.

Decorative layer 40 and decorative layer 52 each comprise any suitably decorative material that is capable of being folded. In an example, decorative layer 40 and decorative layer 52 may each comprise a leather material, a felt material, a vinyl material or vinyl material or printed 3d plastic, ABS or polymer.

Adhesive layer 42, adhesive layer 46, and adhesive layer 50 may comprise any material or substance having two-sided adhesiveness and that is effective to join two adjacent layers to one another. Adhesive layers 42, 46, and 50 may comprise a film adhesive or a liquid adhesive or a spray-on adhesive or any combinations thereof. In a non-limiting embodiment, adhesive layers 42, 46, and 50 are transparent. In another non-limiting embodiment, adhesive layers 42, 46, and 50 are at least partially translucent.

Support layer 44 may be comprised of any material capable of being folded. In a non-limiting example, support layer 44 may comprise a Mylar® material (as used herein, the term Mylar® refers to biaxially oriented polyethylene terephthalate, a polymer; a plastic film comprised of polyester polyethylene terephthalate). In other embodiments, support layer 44 may comprise any other suitable material including, but not limited to vinyl material or printed 3d plastic, ABS or polymer.

Plurality of substrates 48 comprise a plurality of individual substrates, each having a geometric configuration that comprises a constituent part of the decorative repeating pattern of partition 30. In the non-limiting illustrated embodiment, each substrate has a substantially identical geometric configuration. The geometric configuration of each individual substrate 48 is such that, when they are positioned proximate one another in a spaced apart relationship and arranged and oriented in the manner indicated in FIG. 5, then in the aggregate, plurality of substrates 48 and the spaces between them form the herringbone pattern illustrated in FIG. 2. In a non-limiting example, each individual substrate 48 has a diamond configuration. In other embodiments, any other geometric configuration that is effective to form an overall pattern that supports contemporaneous lateral/horizontal and longitudinal/vertical folding may be employed without departing from the teachings of the present disclosure.

Each substrate 48 is comprised of a material that is resistant to folding. In an example, substrate 48 may be comprised of a plexiglass material. In other embodiments, plurality of substrates 48 may be comprised of any other suitable material that is resistant to folding and that is capable of taking on and maintaining a desired geometric configuration. Examples of such material include, but are not limited to vinyl material or printed 3d plastic, ABS or polymer.

When assembled, the various layers of partition 30 are sandwiched together, with adhesive layers disposed between adjacent non-adhesive layers to form an integrated, composite body of disparate, layered materials (referred to herein as the "partition body"). All layers except for the plurality of substrates 48 a capable of folding. Because the plurality of substrates 48 are arranged on support layer 44 in a spaced apart manner, there is space between neighboring substrates 48 to permit the folding of each of the other layers along those spaces.

Once the partition body has been formed, it must then be "trained". As used herein, the term "trained" refers to the process of pre-folding the partition body in a predetermined manner that permits the partition body to contemporaneously fold laterally/horizontally and longitudinally/vertically. An example of how to train a material having a herringbone pattern is illustrated in a YouTube video which can be accessed by conducting a search using the title "Origami Herringbone Tesselation Tutorial", the contents of which are hereby incorporated herein in their entirety by reference. Accordingly, the process of training/folding a sheet of material to impart a herringbone pattern to that sheet of material is well known in the art.

Once the partition body has been trained, it may be cut or otherwise given a contour that will conform to the dimensions, contour, and configuration of the opening that it will be fitted to. In an embodiment, the partition body may be cut or otherwise given the appropriate contour prior to undertaking the training process. Once the partition body has been trained and contoured, it is ready for service as partition 30. The training process not only permits the partition to contemporaneously fold both laterally and longitudinally, but it also creates a creased appearance in the surface of the partition of the repeating pattern. It is the creased appearance that gives rise to the decorative appearance of the partition.

In the illustrated embodiment, the creased appearance is a herringbone pattern. In other embodiments, any other suitable pattern that permits contemporaneous folding in both the lateral and longitudinal directions may be employed without departing from the teachings of the present disclosure.

With continuing reference to FIGS. 1-5, FIG. 6 is a perspective view illustrating support layer 44. In the illustrated embodiment, support layer 44 has a herringbone pattern printed on its surface. Adhesive layer 46 is transparent or sufficiently translucent to permit the printed herringbone pattern remain visible after adhesive layer 46 has been applied. This printing of the herringbone pattern coupled with the use of a transparent or translucent adhesive facilitates the application and positioning of each substrate of plurality of substrates 48 onto support layer 44. In another non-limiting embodiment, support layer 48 may comprise a decorative material, thereby eliminating the need for two separate layers to provide support and decorative roles.

With continuing reference to FIGS. 1-6, FIG. 7 is a perspective view of a non-limiting example of substrate 48. In the illustrated embodiment, substrate 48 has a diamond configuration. This diamond configuration fits within the pattern printed on the surface of support layer 44 shown in FIG. 6 and facilitates the creation of the herringbone pattern. In another embodiment that employs a differing pattern, substrate 48 will have a shape/contour/configuration that, when arranged together with other like-shaped substrate members, will form the differing pattern.

In the illustrated embodiment, substrate 48 is constructed of plexiglass. In other embodiments, substrate 48 may be constructed from any other suitable material that is resistant to folding. When plurality of substrates 48 are arranged and adhered to the surface of support layer 44, this resistance to folding will facilitate the training of the partition body. This is because each un-foldable substrate will be spaced apart from each other un-foldable substrate. This spaced-apart arrangement will leave a gap between individual substrates, both vertically and horizontally, that is bridged by the remaining layers of the partition body. Each of the remaining layers is comprised of a foldable material. A worker undertaking the training process will feel through the partition body with his or her hands for the relatively hard and unfoldable adjacent substrates 48. Once detected, the worker will know to fold the partition body between adjacent substrates 48. In this manner, substrates 48 serve as a guide for the training process.

With continuing reference to FIGS. 1-7, FIG. 8 is a perspective view illustrating plurality of substrates 48 adhered to support layer 44 in a herringbone pattern. In this view, a plurality of longitudinal gaps 56 and a plurality of lateral gaps 58 are disposed between the columns and rows, respectively, formed by plurality of substrates 48. Longitudinal gap 56 and lateral gap 58 facilitate the training of the composite body of disparate layers, as discussed above.

Figure 9:
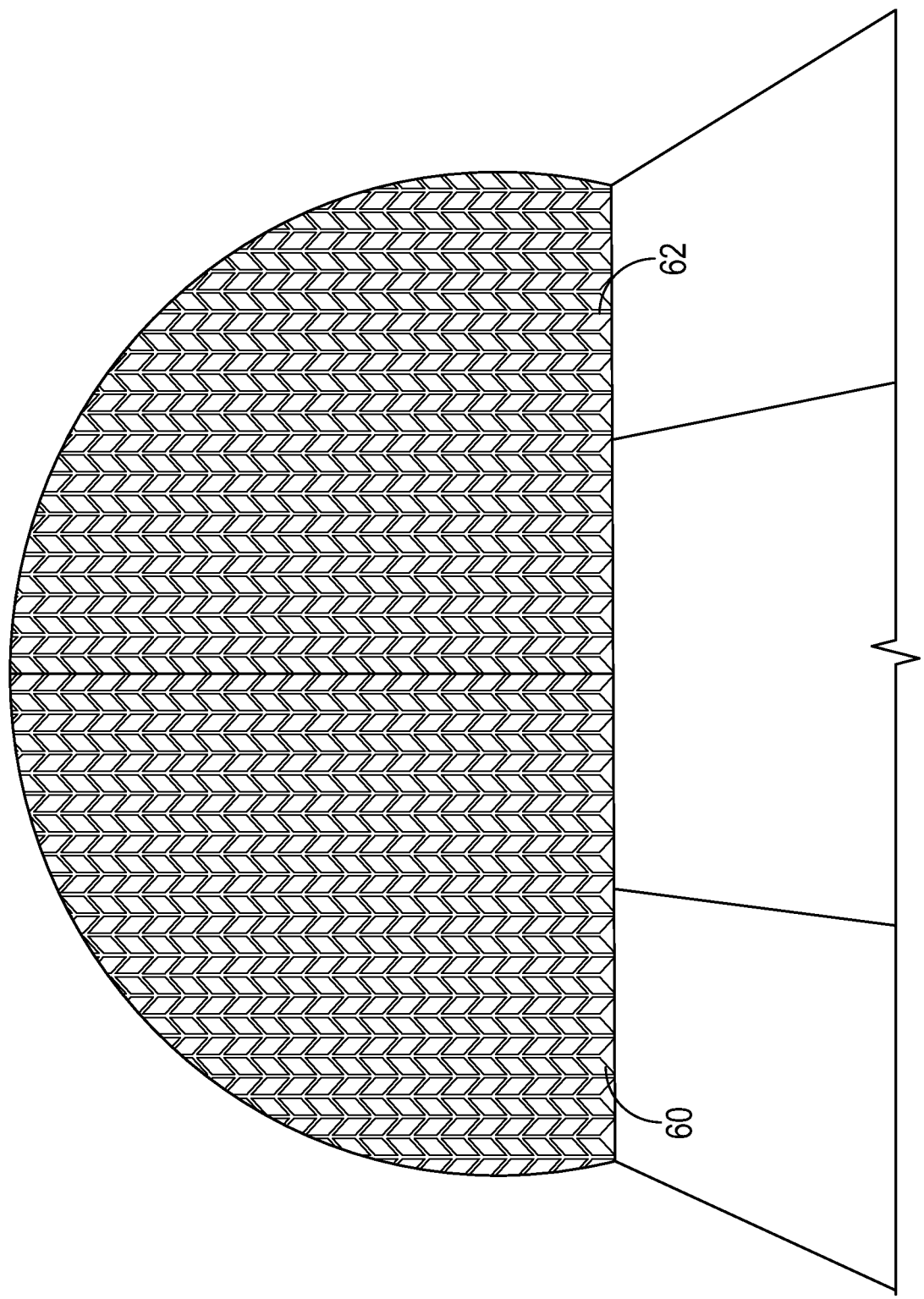
FIG. 9 is a perspective view similar to FIG. 2 where the interior of the vehicle is equipped with an alternate non-limiting embodiment of a partition made in accordance with the teachings of the present disclosure, the partition disposed in a closed configuration.

With continuing reference to FIGS. 1-8, FIG. 9 is a perspective view illustrating an interior of vehicle 20 similar to the view presented in FIG. 2. The primary difference between FIG. 2 and FIG. 9 is that in FIG. 9, the interior of vehicle 20 omits bulkhead 22 and bulkhead 24. Instead, a partition 60 and a partition 62 are used to divide the cabin of aircraft 20 into separate chambers. Partition 60 and partition 62 are identical to partition 30 and partition 32, respectively, in all respects except for contours and dimensions. Partitions 60 and 62 have been given a contour and a dimension that permit each to conform to the interior surfaces of the cabin from wall to wall. In the embodiment illustrated in FIG. 9, partitions 60 and 62 are each coupled to lower portions of opposite walls of the cabin of aircraft 20 and each extends from the opposite walls into a central portion of the cabin to meet in the middle. Their upper contours are configured to conform to the circular arc of the cabin's interior and their lower contours are configured to conform to the straight lines of the cabin's floor. As illustrated in FIG. 9, partitions 60 and 62 are in the extended or closed position. In this position, partitions 60 and 62 divide an otherwise continuous and contiguous chamber into two distinct chambers.

With continuing reference to FIGS. 1-9, FIG. 10 is a perspective view similar to FIG. 9 with partitions 60 and 62 disposed in a retracted or open position. Partition 60 and partition 62 have each contracted horizontally and vertically and have created gap 25 that permits movement between the adjoining chambers formed by partitions 60 and 62. In the illustrated embodiment, gap 25 is maximized. A user may partially close gap 25 by pulling partition 60 and partition 62 towards one another, thereby setting the magnitude of gap 25 to any desirable distance.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A partition comprising:
   a first body comprising a foldable material, the first body having a first side and a second side, the first body having a planar configuration when unfolded;
   a plurality of substrates, each substrate of the plurality of substrates having a flat geometric shape and being resistant to folding; and
   an adhesive,
   wherein each substrate of the plurality of substrates is adhered to the second side of the first body by the adhesive and arranged in a repeating pattern defining a plurality of columns and a plurality of rows, each column of the plurality of columns being spaced apart from each neighboring column to define a plurality of longitudinally extending gaps between columns and each row of the plurality of rows being spaced apart from each neighboring row to define a plurality of laterally extending gaps between rows,
   wherein the first body is configured to fold in a lateral direction along the plurality of longitudinally extending gaps in an accordion-like manner and to contemporaneously fold in a longitudinal direction along the plurality of laterally extending gaps between rows in the accordion-like manner,
   wherein the partition contracts both laterally and longitudinally when the first body contemporaneously folds in both the lateral direction and the longitudinal direction, and wherein the partition extends both laterally and longitudinally when the first body contemporaneously unfolds in both the lateral direction and the longitudinal direction.

2. The partition of claim 1, wherein the flat geometric shape of each substrate is substantially identical to the flat geometric shape of each other substrate.

3. The partition of claim 1, wherein a ratio of a lateral contraction of the partition to a longitudinal contraction of the partition is at least 2:1.

4. The partition of claim 1, wherein the first foldable body comprises a plastic film comprised of polyester polyethylene terephthalate material.

5. The partition of claim 1, wherein each substrate of the plurality of substrates comprises a plexiglass material.

6. The partition of claim 1, wherein the repeating pattern is printed on the second side.

7. The partition of claim 1, wherein the first body has a configuration when unfolded that conforms with an opening associated with the partition.

8. The partition of claim 1, wherein the repeating pattern comprises a herring bone pattern.

9. A partition comprising:
a first body comprising a foldable material, the first body having a first side and a second side, the first body having a planar configuration when unfolded;
a plurality of substrates, each substrate of the plurality of substrates having a flat geometric shape and being resistant to folding;
a second body comprising a decorative, foldable material, the second body having the planar configuration when unfolded;
a third body comprising the decorative, foldable material, the third body having the planar configuration when unfolded; and
an adhesive;
wherein each substrate of the plurality of substrates is adhered to the second side of the first body by the adhesive and arranged in a repeating pattern defining a plurality of columns and a plurality of rows, each column of the plurality of columns being spaced apart from each neighboring column to define a plurality of longitudinally extending gaps between columns and each row of the plurality of rows being spaced apart from each neighboring row to define a plurality of laterally extending gaps between rows,
wherein the second body is adhered to the first side of the first body by the adhesive,
wherein the third body is adhered to the second side of the first body and to a back side of the plurality of substrates by the adhesive,
wherein the first body and the second body and the third body are configured to fold in a lateral direction along the plurality of longitudinally extending gaps in an accordion-like manner and to contemporaneously fold in a longitudinal direction along the plurality of laterally extending gaps between rows in the accordion-like manner,
wherein the partition contracts both laterally and longitudinally when first body, the second body, and the third body contemporaneously fold in both the lateral direction and the longitudinal direction, and
wherein the partition extends both laterally and longitudinally when the first body, the second body, and the third body contemporaneously unfold in both the lateral direction and the longitudinal direction.

10. The partition of claim 9, wherein a ratio of a lateral contraction of the partition to a longitudinal contraction of the partition is at least 2:1.

11. The partition of claim 9, wherein the first body comprises a plastic film composed of polyester polyethylene terephthalate material.

12. The partition of claim 9, wherein each substrate of the plurality of substrates comprises a plexiglass material.

13. The partition of claim 9, wherein the second body and the third body each comprise a leather material.

14. The partition of claim 9, wherein the repeating pattern is printed on the second side of the first body.

15. The partition of claim 9, wherein the first body has a configuration when unfolded that conforms with an opening associated with the partition.

16. The partition of claim 9, wherein the repeating pattern comprises a herring bone pattern.

17. The partition of claim 9, wherein the flat geometric shape of each substrate is substantially identical to the flat geometric shape of each other substrate.

18. The partition of claim 17, wherein the laterally extending gaps extend laterally in a zig-zag pattern.

* * * * *